United States Patent [19]  
Ernst et al.

[11] 3,985,215  
[45] Oct. 12, 1976

[54] CLUTCH DISENGAGER DEVICE

[75] Inventors: Horst M. Ernst, Eltingshausen; Manfred Brandenstein, Aschfeld; Armin Olschewski, Schweinfurt, all of Germany

[73] Assignee: SKF Industrial Trading and Development Company, B.V., Jutphaas, Netherlands

[22] Filed: Dec. 6, 1974

[21] Appl. No.: 530,381

[30] Foreign Application Priority Data  
Dec. 21, 1973 Germany............... 7345380[U]

[52] U.S. Cl. .................... 192/98; 192/110 B  
[51] Int. Cl.² .................................... F16D 19/00  
[58] Field of Search ................ 192/110 B, 98

[56] References Cited  
UNITED STATES PATENTS  
3,741,361   6/1973   Bradenstein................. 192/110 B  
3,877,557   4/1975   Maucher....................... 192/98  
3,882,979   5/1975   Limbacher et al............ 192/110 B  
3,885,658   5/1975   Ernst et al. .................. 192/98

*Primary Examiner*—Samuel Scott  
*Assistant Examiner*—Randall Heald  
*Attorney, Agent, or Firm*—Daniel M. Rosen

[57] ABSTRACT

A clutch disengagement device having an antifriction bearing connected for radial movement on a sliding sleeve by a centering ring. The centering ring, which is fastened to the nonrotating bearing race, is fastened to the sliding sleeve by at least one clamp which surrounds a radial flange of the sliding sleeve, or of the centering ring, with radial play.

10 Claims, 6 Drawing Figures

CLUTCH DISENGAGER DEVICE

THE INVENTION

This invention relates to clutch disengaging devices and particularly to a clutch disengagement device having an antifriction bearing with its nonrotating bearing race connected for radial movement with a sliding sleeve by a centering ring of thin-walled material.

A clutch disengager of this type is known from German Petty Pat. No. 7,135,794. In order to permit radial movements of adjustment of the antifriction bearing, the centering ring is fastened by bolts to the sliding sleeve, the centering ring or the sliding sleeve being provided, at the points of passage for the bolts, with holes which are larger than the diameter of the bolts.

The object of the invention is to provide an improved clutch disengager of simple construction and economic manufacture.

It is another object of the invention to provide a clutch engager wherein the centering ring is fastened to the sliding sleeve without a friction mounting, and with larger amounts of radial adjustment movement being possible.

The foregoing objects are achieved in accordance with the present invention, with a clutch disengagement device of the aforementioned type, by fastening the centering ring, which is fastened to the nonrotating bearing race to the sliding sleeve by at least one clamp. The clamp surrounds, with radial play, a radial flange of the sliding sleeve or of the centering ring.

A clutch disengager constructed in this manner consists of fewer structural parts than the clutch disengager of the prior art and is thus easier to mount. Furthermore, larger radial adjustment movements for purposes of self-centering are thereby possible.

The simple construction and economic manufacture of the clutch disengager of the invention can be further increased by forming the clamp as a single piece with the sliding sleeve or with the centering ring.

In order to secure against twisting, the clamp may advantageously be engaged into a recess on the outer circumference of the radial flange of the sliding sleeve or of the centering ring.

As a further development of the invention, the radial surface of the clamp which enters into contact with a disengagement fork is hardened. As a result, the sliding sleeve itself need not be hardened, and thus the possibility of hardening distortion after the noncutting shaping thereof is eliminated.

As a final additional constructional advantage, in order to reduce the grease-filling space between the antifriction bearing and the sliding sleeve, and to provide a better seal, a filling ring of plastic or the like may be placed between the outer ring of the antifriction bearing and the sliding sleeve.

Further objects, features and advantages of the invention will become more evident from the following more detailed description of several alternative embodiments, taken with the appended axial section drawings, wherein.

Figure 1:
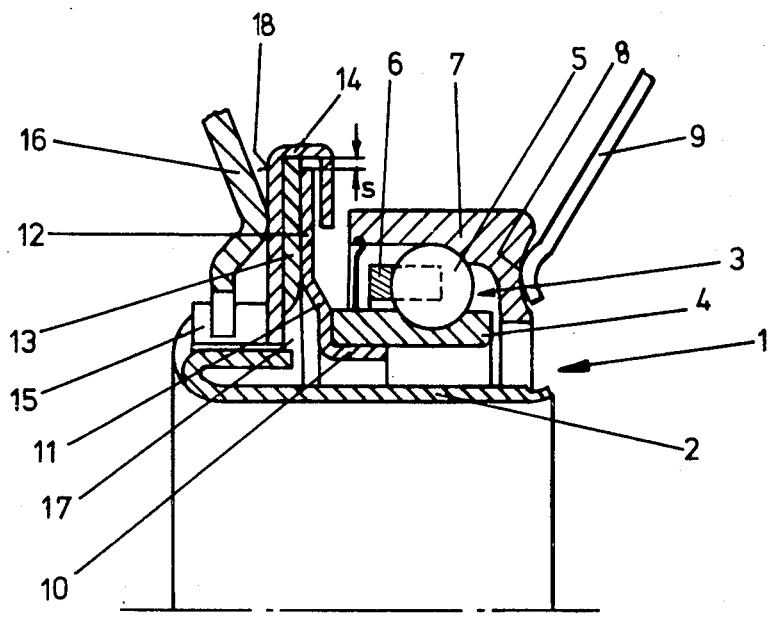
FIG. 1 illustrates an axial view of a clutch disengager in accordance with the present invention.

Referring now to FIG. 1, there is shown a clutch disengager 1 having a sliding sleeve 2 made of sheet metal and an antifriction bearing 3. The antifriction bearing 3 has a solid inner race 4, balls 5, a cage 6 and a solid outer race 7. One face surface 8 of the outer race 7 is in the shape of a concave circular ring and enters into contact with clutch levers 9 of a clutch, not shown in further detail.

The inner race 4 is fastened by means of its bore on the axial shoulder 10 of a centering ring 11 with a press seat. The centering ring 11 has a radial flange 12 and the sliding sleeve 2 has a radial flange 13, both of which are gripped around by a clamp 14. Between the upper edge of the flange 12 and the clamp 14 there is a radial clearance s, allowing the antifriction bearing 3 to move in a radial direction together with the centering ring 11. In this way the antifriction bearing 3 automatically centers itself when there are any errors in alignment to be taken up between the clutch and the clutch disengager 1. In the axial direction there is a slight clearance between the surrounding part of the clamp 14 and the flange 12, so that no frictional clamping will take place.

The clamp 14 is provided with spring arms 15 into which a disengagement fork 16 is snapped for actuating the clutch disengager 1 upon disconnecting the clutch. The arms 15 of the clamp 14 extend into a radially inwardly bent recess 17 of the sliding sleeve 2 so as to be secured against twisting.

The radial surface 18 of the clamp 14, which comes into contact with the disengagement lever 16, is hardened. In this way the hardening of the sliding sleeve 2, after its production by noncutting methods, is dispensed with, so that no distortion due to hardening occurs on the sleeve 2.

Figure 2:
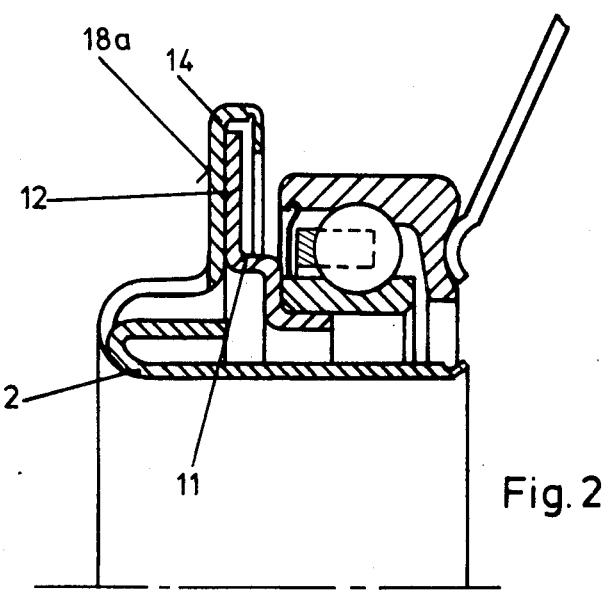
FIG. 2 shows an axial view of an alternative embodiment of FIG. 1 wherein the clamp and sleeve are integral.

In the embodiment shown in FIG. 2, the clamp 14 is integral with the displacement sleeve 2. In order to create a structurally sound unit, the clamp 14 is flanged-over only after the installation of the centering ring 11, so that its flange 12 is connected with axial and radial play to the sliding sleeve 2. Additional clamping is thus not required. In order to avoid hardening of the radial surface 18a of the sliding sleeve 2 which comes into contact with the disengagement fork 16, it may be advantageous to fasten a hardened pressure ring (not shown) to it.

Figure 3:
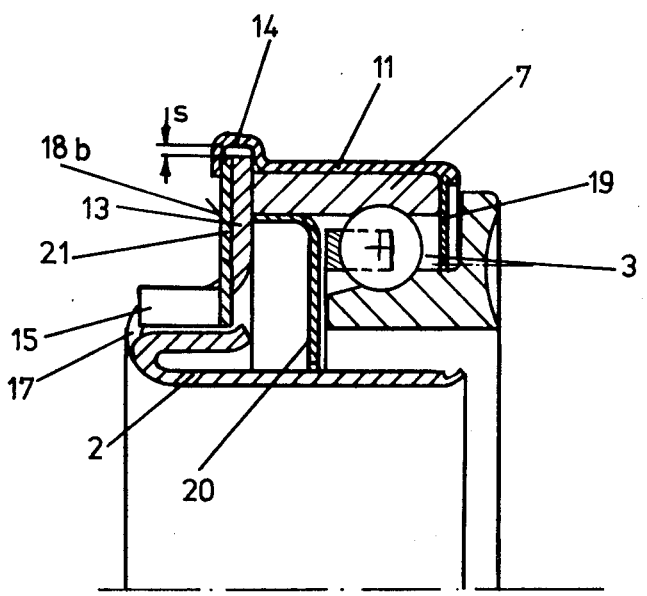
FIG. 3 is illustrative of an axial view of a further alternative embodiment of the clutch disengager.

In the alternative embodiment illustrated by way of example in FIG. 3, the nonrotating bearing race, shown in FIG. 3 as the outer race 7, is connected with the centering ring 11 in a manner such that the latter surrounds the outer race 7. In order to seal off the antifriction bearing, a sealing disc 19 is clamped between a face side of the outer race 7 and the centering ring 11. Another sealing disc 20 is inserted in the bore of the outer race 7. Due to the L shape of the sealing disc 20, the inside grease-filled space of the antifriction bearing 3 is reduced, thereby reducing the quantity or amount of grease to be introduced.

As shown in FIG. 3, the centering ring 11 is integral with the clamp 14. The latter surrounds the flange 13 of the sliding sleeve 2 with radial play s. The end of the clamp 14 which surrounds the flange 13 towards the outside also holds a pressure ring 21 which, in a manner similar to the clamp 14 in FIG. 1, includes arms 15 for engaging the radially inwardly bent recess 17 of the sliding sleeve 2, in a twist-proof manner. The radial surface 18b of the pressure ring 21, coming into contact with a disengagement fork, is hardened.

Figure 4:
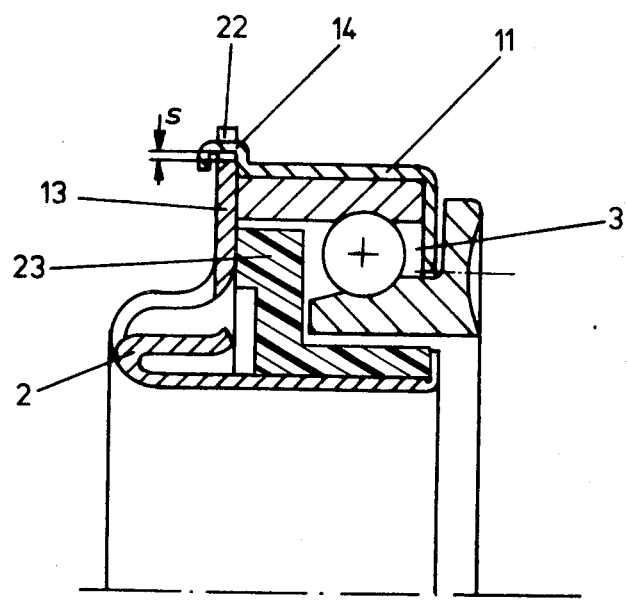
FIG. 4 shows an axial view of a variation of the embodiment of FIG. 3.

A variant of the embodiment of FIG. 3 is shown in FIG. 4. As shown in FIG. 4, as in FIG. 3, the clamp 14 is integral with the centering ring 11. To further prevent twisting however, the clamp 14 is designed to engage a recess 22 on the outer circumference of the flange 13 of the sliding sleeve 2. Additionally, the L-shaped sealing disc 20 of FIG. 3 is replaced in the variant of FIG. 4 by a filling ring 23 made of plastic and placed on the sliding sleeve 2. The function of the filling ring 23 is the same as that of the sealing disc 20, namely to reduce the grease filling space within the antifriction bearing 3 and to provide for the contact-free sealing thereof.

Figure 5:
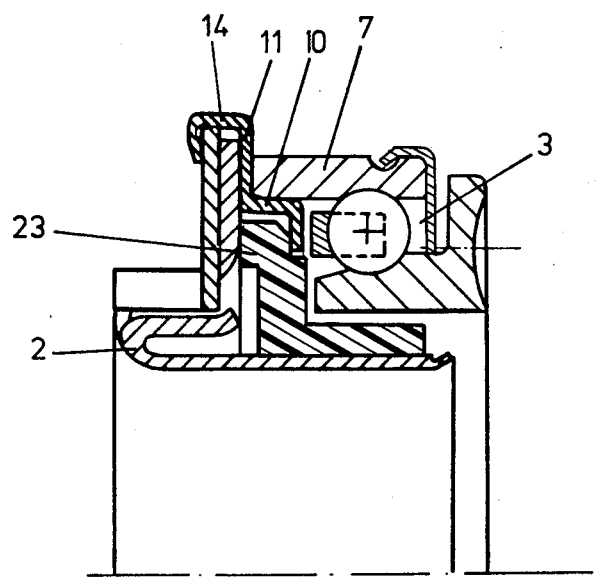
FIG. 5 illustrates an axial view of a further variation of the clutch disengager of the present invention.

Referring now to FIG. 5, the nonrotating bearing ring, shown as the outer race 7, is pressed onto an axial shoulder 10 of the centering ring 11. In this embodiment as well, the centering ring 11 is integral with the clamp 14 and a stepped filling ring 23 placed on the sliding sleeve 2 reduces the grease filling space of the antifriction bearing 3 and seals the latter off from the outside.

Figure 6:
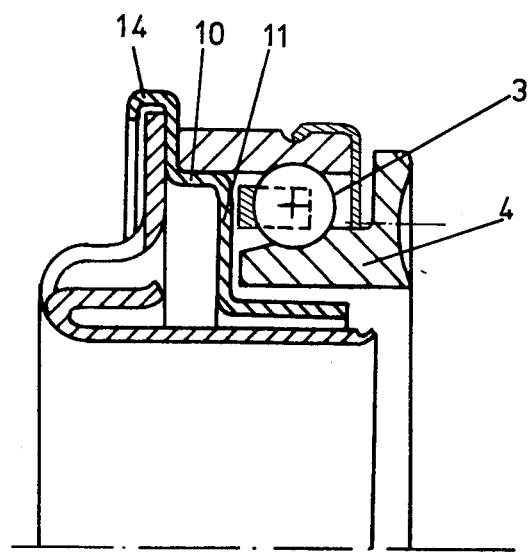
FIG. 6 shows an axial view of a further embodiment of the clutch engager of the present invention.

In the embodiment of FIG. 6, the centering ring 11 which is formed integrally with the clamp 14 itself serves to reduce the size of the grease filling space of the antifriction bearing 3 and seal it off. For this purpose, the centering ring 11 is extended radially inwards adjoining the axial shoulder 10 and grips below the inner race 4. In this way, the filling ring 23 shown in FIG. 5 can be dispensed with.

What is claimed is:

1. A clutch disengager comprising an antifriction bearing having a rotating race and a nonrotating race, a sleeve having a radially extending flange, centering ring means on said nonrotating race, and clamping means mounted to clamp said centering ring means and said flange in the axial direction of said bearing while permitting radial movement of said nonrotating race with respect to said sleeve.

2. The clutch disengager of claim 1, wherein said clamping means is mounted to clamp said centering ring means and flange in both axial directions of said bearing.

3. The clutch disengager of claim 1, wherein said clamping means is integral with said sliding sleeve radial flange.

4. The clutch disengager of claim 1, wherein said clamping means is integral with said centering ring means.

5. The clutch disengager of claim 1, wherein said centering ring means surrounds said nonrotating race.

6. The clutch disengager of claim 1, wherein said nonrotating race is placed on an axial shoulder of said centering ring means.

7. The clutch disengager of claim 1, wherein said clamping means engages a recess formed in said radial flange of said sliding sleeve with radial play.

8. The clutch disengager of claim 1, wherein said clamping means includes a radial surface for contact with a disengagement fork, said radial surface including a pressure ring which is hardened for contacting said fork.

9. The clutch disengager of claim 1, wherein a filling ring is arranged between an outer race of said antifriction bearing and said sliding sleeve.

10. A clutch disengager comprising a sliding sleeve, an antifriction bearing mounted for radial movement on said sliding sleeve, said antifriction bearing having a rotating and a nonrotating race with roller elements encaged therebetween, a centering ring fastened to said nonrotating race, said sliding sleeve including a radial flange extending outwardly therefrom, and clamping means for clamping said centering ring and said radial flange together in both axial directions of said bearing while allowing radial play between said centering ring and radial flange for adjusting the radial position of said bearing on said sleeve in accordance with a radial centering force, said bearing including a curved face and means contacting said curved face for applying said radial force.

* * * * *